Sept. 26, 1961   H. W. WHITING   3,001,667
PORTABLE GRAIN HOPPER
Filed Sept. 14, 1959

INVENTOR.
HARRY W. WHITING
BY
*Jerry J Dunlap*
ATTORNEY 3,001,667
PORTABLE GRAIN HOPPER
Harry W. Whiting, Rural Route, Lamont, Okla.
Filed Sept. 14, 1959, Ser. No. 839,743
3 Claims. (Cl. 220—69)

My invention relates to an improved grain hopper for receiving and temporarily holding grain, and more particularly, but not by way of limitation, to a portable grain hopper of the type ordinarily used near the intake conveyor of a grain elevator.

As is well known in the art, it is convenient at a grain elevator to have a hopper to receive and hold grain dumped from a truck, and to provide a constant feed to the elevator's grain conveyor intake. Such hoppers are usually designed with a relatively broad open top and a smaller bottom, so that as grain is removed from the bottom of the hopper it will be replaced by natural flow of grain from above. Some hoppers have an opening at the lowest point in the bottom, through which grain flows to a conveyor mechanism. Others are closed at the bottom and grain is removed from the hopper by placing a conveyor tube in the hopper with the open end of the tube near the bottom of the hopper, where grain will be fed to the conveyor inlet at the end of the tube. However, in all prior constructions, the hopper has either been constructed as a part of the grain conveyor apparatus, thereby limiting the use of the conveyor apparatus, or the hopper has been of heavy construction and not easily moved from one location to another. Usually, the hopper is loaded with grain from a grain carrying vehicle, such as a truck, which has been brought alongside the hopper. Frequently, in positioning such a vehicle to load the hopper, the vehicle will bump the hopper— causing it to bend or break.

The present invention contemplates a novel portable grain hopper which will movably yield to impact caused by bumping, and return to its original position after the energy of the impact is dissipated, thus reducing or eliminating damage that might otherwise be caused by such impact. The present invention also contemplates a hopper construction which is not part of the conveyor apparatus and yet is of light weight and easily moved from one location to another.

An important object of this invention is to provide a grain hopper that will movably yield to resist damage that might otherwise be caused by bumping the hopper with a truck or the like.

Another object of this invention is to provide a grain hopper that will return to its original position after being displaced by bumping or other forces.

A further object of this invention is to provide a grain hopper which may be easily moved from one location to another, may be economically manufactured, and which will have a long service life.

Other objects and advantages of the invention will be evident from the following detailed description, when read in conjunction with the accompanying drawings which illustrate my invention.

Figure 1:
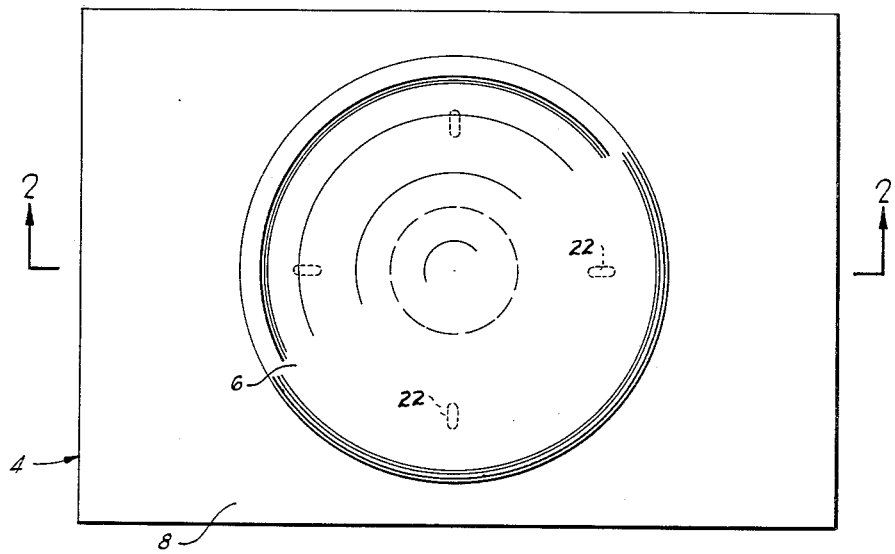
FIGURE 1 is a plan view of a portable grain hopper constructed in accordance with this invention and illustrating the hopper in its normal position.

Referring to the drawings in detail, reference character 4 generally designates a novel grain receiver construction comprising a hopper member 6 mounted on a base 8, and attached to the base by coil springs 10, in tension.

The hopper 6 is formed out of any suitable material which is light weight, such as sheet metal and has an opening 12 at the top 14 thereof of sufficient area to permit easy loading of grain into the hopper, as well as to permit entry of a screw-type grain conveyor tube 16 of any suitable construction. Preferably, the hopper 6 is constructed with a circular horizontal cross section, broadest at the top 14 and relatively narrower at the bottom 18 thereof, so that grain will tend to flow to the lowest point in the hopper. The bottom 18 of the hopper is curved, preferably having the configuration of a spherical segment, and is smooth to permit slidable contact with the base 8.

The outer rim 20 of the hopper, where blows are most likely to be received from trucks or the like (not shown), is reinforced, to distribute the energy of the blow. The rim 20 may be reinforced by turning the edge of the hopper out and down, as shown in the drawing. Four lugs 22 are attached to the outer surfaces of the side walls 24 of the hopper and are spaced at the same height and at equal intervals around the hopper. Each lug 22 is adapted to be connected to one end of one of the coil springs 10. In the drawing, this is shown as a simple eye or loop to receive a hook on the end of the respective spring. The lugs 22 are spaced well above the bottom 18 of the hopper 6 so they will not interfere with movement of the hopper on the base 8.

The portable base 8 may be constructed of wood or the like, but is preferably in the form of a hollow box constructed of sheet metal to provide a light weight and economical construction. The base 8 must have sufficient strength to support the loaded hopper 6, and be of sufficient size to resist movement of the base when the hopper 6 is bumped. The top member 24 of the base 8 is substantially flat, but has a recessed socket 26 in the central portion thereof of a size to loosely receive the curved bottom 18 of the hopper 6, so that the hopper can move freely within the socket while supported by the base. Also, the lower member 28 of the base 8 should be substantially flat to support the base in a level position on the ground.

Four lugs 30 are suitably attached to the top 24 of the base 8 in equally spaced relation around the recessed socket 26, with each lug 30 being opposed to one of the lugs 22 attached to the sides of the hopper 6. Each lug 30 is suitably constructed to receive a hook at the lower end of the respective coil spring 10.

*Operation*

Figure 2:
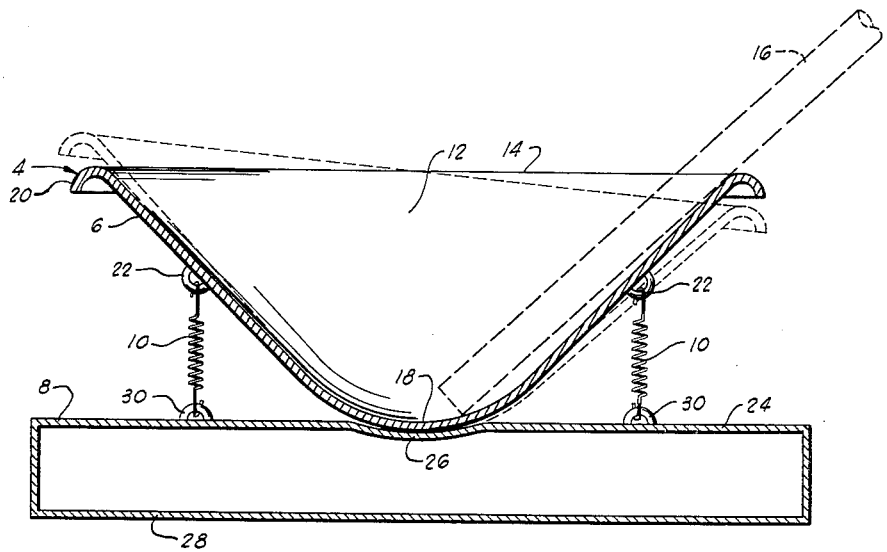
FIGURE 2 is a vertical section taken along lines 2—2 of FIG. 1, illustrating the hopper in normal position by solid lines, and in a displaced position by dotted lines.

From the drawings and the foregoing description, it is apparent that when no outside force is acting on the hopper 6, it will be held in an upright position at rest in the recessed socket 26 by the springs 10. In this connection, it should be noted all of the springs 10 are preferably of equal strength. Thus, all parts will be in a state of static equilibrium. Whenever the hopper 6 receives an impact, such as a bump from a truck, from any direction, the bottom 18 of the hopper 6 will slide in the socket 26 and the hopper will be tilted as shown in dotted lines in FIG. 2. When the hopper moves with respect to the base 8, each spring 10 will be distorted by change in the relative positions of the lugs 22 and 30 to which it is attached, causing the springs to exert forces on the hopper that tend to urge it back to its original position. The cooperation of the curved shape of the bottom 18 of the hopper 6 and the recessed socket 26 in the base 8 will resist lateral displacement of the hopper and will cause the hopper to tilt within the socket in response to forces applied to the hopper.

One of the novel features of the present invention is the combination of parts which facilitates portability of the device. When it is desired to move from one location to another, the springs 10 may be easily disconnected from the lugs 22 or 30, or both, such that the hopper 6 may be moved separately from the base 8. When the hopper 6 is made out of sheet metal, it may be easily picked up by gripping the rim 20, and when the base 8 is made in the form of a hollow box, it may also be easily moved. In assembling the device, it is merely necessary to place the hopper bottom 18 in the socket 26 and turn the hopper until the lugs 22 and 30 are aligned; whereupon the springs 10 are hooked into the respective lugs.

It is to be understood that the form of my invention herein shown and described is to be taken as a preferred example of the same and that various changes in shape, size and arrangement of the parts, or other changes in detail, or substitution of equivalent parts, may be resorted to without departing from the spirit or scope of my invention as defined in the following claims.

I claim:

1. A portable grain hopper device for temporarily storing grain received from trucks or the like prior ttoo the elevation of the grain by a grain elevator comprising a base member adapted to rest on the ground at a location where it is desired to dump grain from the truck, said base member having a frustospherical indentation centrally positioned in its upper surface; a generally conical hopper having a spherically rounded apex resting on said base member with its apex in said indentation for tilting movement of said hopper in response to inadvertent blows from said trucks; and elastic means connected between said hopper and the base member for constantly urging the hopper into an upright position.

2. A portable grain hopper as claimed in claim 1 wherein said elastic means comprise a plurality of helical springs arranged in equally spaced relation around said hopper and extending substantially vertically between the sides of said hopper and said base member; and wherein said indentation and apex are dimensioned to permit said hopper to be slidingly displaced horizontally with respect to said base member when horizontally acting forces of large magnitude are applied to said hopper.

3. A device as claimed in claim 1 wherein the edge of said hopper at the upper end thereof is curved outwardly and downwardly to form a reinforcing lip around said hopper and permitting said hopper to be lifted upwardly by means of said lip.

References Cited in the file of this patent

UNITED STATES PATENTS

| | | |
|---|---|---|
| 1,101,286 | Jones | June 23, 1914 |
| 1,910,484 | Thompson | May 23, 1933 |
| 2,634,020 | Bartholomew | Apr. 7, 1953 |
| 2,748,952 | Fleit et al. | June 5, 1956 |
| 2,806,074 | Duncklee et al. | Sept. 10, 1957 |

FOREIGN PATENTS

| | | |
|---|---|---|
| 694,715 | France | Sept. 22, 1930 |